(12) United States Patent
Lodico

(10) Patent No.: US 9,707,630 B2
(45) Date of Patent: Jul. 18, 2017

(54) POWER MILLING MACHINE

(71) Applicant: Putsch GmbH & Co. KG, Hagen (DE)

(72) Inventor: Michele Lodico, Hagen (DE)

(73) Assignee: PUTSCH GMBH & CO. KG, Hagen (DE)

( * ) Notice: Subject to any disclaimer, the term of this patent is extended or adjusted under 35 U.S.C. 154(b) by 0 days.

(21) Appl. No.: 15/183,877

(22) Filed: Jun. 16, 2016

(65) Prior Publication Data

US 2016/0375507 A1    Dec. 29, 2016

(30) Foreign Application Priority Data

Jun. 29, 2015   (DE) .................. 10 2015 110 405

(51) Int. Cl.
| | |
|---|---|
| B23C 5/26 | (2006.01) |
| B23C 5/08 | (2006.01) |
| B23B 31/40 | (2006.01) |
| B23B 31/42 | (2006.01) |
| B23B 31/117 | (2006.01) |

(52) U.S. Cl.
CPC ............ *B23C 5/26* (2013.01); *B23B 31/1173* (2013.01); *B23B 31/1175* (2013.01); *B23B 31/1177* (2013.01); *B23B 31/40* (2013.01); *B23B 31/4073* (2013.01); *B23B 31/42* (2013.01); *B23C 5/08* (2013.01); *B23B 2231/50* (2013.01); *B23C 2270/06* (2013.01); *Y10S 279/907* (2013.01); *Y10T 83/9379* (2015.04); *Y10T 279/1033* (2015.01); *Y10T 279/1066* (2015.01); *Y10T 409/309464* (2015.01)

(58) Field of Classification Search
CPC ......... Y10T 279/1066; Y10T 279/1033; Y10S 279/907; B23B 31/1175; B23B 31/1177; B23B 31/1176; B23B 31/1178; B23B 31/40; B23B 2231/50; B23C 5/26; B23C 5/08; B23C 2270/06
USPC .................. 279/2.17, 2.09, 907; 409/233
See application file for complete search history.

(56) References Cited

U.S. PATENT DOCUMENTS

| 870,220 A | * | 11/1907 | Brooks | ................. B27B 5/32 |
| | | | | 83/666 |
| 2,824,744 A | * | 2/1958 | Peters | .................. B23B 31/207 |
| | | | | 279/2.17 |
| 2,893,742 A | * | 7/1959 | Frohner | .............. B23B 31/1175 |
| | | | | 279/2.04 |

(Continued)

FOREIGN PATENT DOCUMENTS

DE   202011050262 U1 *  5/2012 ......... B23B 31/1177

*Primary Examiner* — Erica E Cadugan
(74) *Attorney, Agent, or Firm* — Andrew Wilford

(57) ABSTRACT

A milling apparatus has a housing, a drive shaft extending along and rotatable about an axis in the housing and an axially compressible and radially expansible washer stack on the front end of the drive shaft. A tool is held by the on the shaft. A bolt projects radially in a slot through the shaft and is limitedly axially displaceable in the shaft. An actuator element shiftable axially in the passage projects axially forward out of the drive shaft and is fixed in the bolt. A clamping assembly axially compresses and radially expands the stack so as to lock the tool to the drive shaft. A spring assembly is braced axially forward against the housing and axially rearward against the bolt. A piston axially displaceable on the drive shaft in the housing bears axially forward on the bolt.

11 Claims, 3 Drawing Sheets

(56) References Cited

U.S. PATENT DOCUMENTS 3,036,838 A * 5/1962 Barber ................ B23B 31/1177
                                                    279/2.17
3,674,280 A * 7/1972 Pedersen ............. B23B 31/1177
                                                    279/2.17
4,009,637 A * 3/1977 Bittner ...................... B23C 3/12
                                                     409/231

* cited by examiner

POWER MILLING MACHINE

FIELD OF THE INVENTION

The present invention relates to a miller. More particularly this invention concerns a power milling machine, for instance for sharpening blades of a sugar-beet processor.

BACKGROUND OF THE INVENTION

A power milling machine typically has a drive shaft rotatably mounted in a housing, a rear end thereof projecting out from the housing and having means for coupling to a rotary drive and a front end thereof projecting out from the housing and carrying a milling tool, in particular a milling disk that is mounted with an axial hole onto a washer stack retained on the front shaft end by annular clamping elements, and abuts against an abutment fixed to the shaft, it being possible to clamp a washer stack thereof in a friction-locked manner by a clamping assembly against the inner surface the hole of the tool.

With such a device, for example, a toothed belt wheel coupled to a rotary drive is fixed at the rear end of the drive shaft rotatably mounted in the housing. The device may be arranged with the housing as a part of a machine or apparatus.

A milling tool, example, a milling disk, is fixed at the front end of the drive shaft projecting out of the housing. The milling tool has a central hole by means of which it can be mounted onto a washer stack that has annular clamping elements on the shaft end. The shaft also carries an abutment against which the milling tool can be pressed. To fix the tool, the washer stack with the annular clamping elements can be clamped by a clamping assembly which is formed, for example, by a clamping head and a clamping screw. The clamping head is supported on the end of the tool and/or the washer stack. The screw is fixed and braced against the end of the drive shaft. If the tool is worn out or must be switched for any other reason, then it is necessary to loosen and remove the clamping assembly in order to be able to remove the tool from the washer stack with the annular clamping elements and replace the tool with another tool. This approach is costly and requires another tool, typically a pair of wrenches, and the space available often makes handling and fitting of the fresh milling tool difficult, because the space is covered with other parts of the device or the corresponding machine.

The washer stack with the annular clamping elements is a known clamping element that can apply an axial force through the clamping assembly to expand the washer stack radially with the annular clamping elements and brace it against the inner surface of the hole of the tool. Thus, torque is transmitted to the tool that is locked on the drive shaft.

OBJECTS OF THE INVENTION

It is therefore an object of the present invention to provide an improved milling apparatus.

Another object is the provision of such an improved milling apparatus that overcomes the above-given disadvantages, in particular with which little effort is needed to always set the same clamping force for the tool, that requires minimal installation space in order for the tool to be switched, and with which the tool can be easily replaced without any replacement-related tools.

SUMMARY OF THE INVENTION

A milling apparatus has according to the invention a housing, a drive shaft extending along and rotatable about an axis in the housing and having an axially front end, an axially rear end, an axially extending central passage open at the front end, and a transversely throughgoing and axially elongated slot, and an axially compressible and radially expansible washer stack on the front end of the drive shaft. A tool has a central hole with a diameter greater than a dasymeter of the washer stack when axially not compressed and radially expanded. A bolt projects radially in the slot through the shaft and is limitedly axially displaceable in the shaft. An actuator element shiftable axially in the passage has a front end projecting axially forward out of the drive shaft and an opposite rear end fixed in the bolt. A clamping assembly on the front end of the drive shaft and connected to the actuator element axially compresses and radially expands the stack so as to lock the tool to the drive shaft. A spring assembly braced axially forward against the housing and axially rearward against the bolt urges the bolt and clamping assembly axially rearward to radially expand the washer stack and lock the tool on the drive shaft. A piston axially displaceable on the drive shaft in the housing bears axially forward on the bolt. Means for pressurizing a rear face of the piston presses pressing the piston forward against the bolt to compress the spring assembly and relax the washer stack so that the tool can be taken off the drive shaft. Depressurization at the rear race allows the spring assembly to rearwardly shift the bolt and thereby lock the washer stack to the tool.

According to this arrangement, the initial installation of the tool is handled in a known manner, by mounting the tool onto the washer stack with the annular clamping elements and creating a friction-locked connection between the inner surface of the tool hole and the washer stack through the clamping assembly. This friction-locked connection is only done at the initial assembly of the tool. When the tool is later switched, the previously set clamping force is once again also achieved with the replacement tool.

When the tool needs to be replaced by another, the piston located in the housing is subjected to a pressure medium, for example, hydraulically, such that the piston is moved in the direction of the front end of the drive shaft against the spring force of the spring assembly. This applies force from the piston to the actuator rod and the bolt whose displacement relative to the drive shaft is limited, thereby causing the clamping assembly to be displaced relative to the drive shaft and relaxing the washer stack with the annular clamping elements. In this position, the tool can be removed by being withdrawn axially from the drive shaft with the hole thereof. The hole of the tool is dimensioned so that the tool can be move over the clamping assembly without obstruction by the clamping assembly. A new tool can then be pushed on. Removal and placement of the tool are both done manually. Pressure can then be relieved by depressurizing the piston, whereby the prestressed spring assembly takes over. This displaces the parts—the piston, bolt, actuator rod, and clamping assembly—back into the clamping position (independently), so that the tool is again clamped and available for further machine operation.

This design makes it possible for the tool to always be clamped with the same force. Moreover, replacing the tool requires only a small installation space, because the tool need only by withdrawn axially from the shaft or slid axially onto the shaft. There is no need for additional space for tools or the like. Assembly and disassembly can be done without tools. This improves the reliability of the device and reduces the time needed to switch tools.

Particularly preferably, the clamping assembly is composed of a clamping sleeve having a clamping head and a cap screw. The sleeve engages the passage of the drive shaft, and the cap screw thereof is indirectly supported with interposition of a clamping piece or directly supported on the end face of the washer stack with annular clamping elements that face away from the abutment fixed to the shaft. The cap screw is braced with its head on the clamping head, and is screwed into the actuator rod with its threaded shaft. This leaves an axial space between the actuator rod and the clamping sleeve, and the dimensions of the clamping head, the clamping piece, and the head of the cap screw transversely to the axial extension of the drive shaft are selected so that the tool with the hole thereof can be slid on via the hole.

This arrangement makes it possible to easily set the clamping force by actuating the clamping assembly during the initial installation, but also makes it easy to remove the tool and install a new replacement tool by corresponding application of pressure to the piston when used as intended.

In order to easily create a connection between the actuator rod and bolt, the actuator rod has at its rear end a threaded piece that is screwed into a threaded hole of the bolt. To compensate for possible tolerances during installation, the actuator rod has, at the its rear side, a spherical support surface that abuts against a spherical surface of the bolt or of a support ring between the bolt and the support surface. This arrangement enables a restraint-free fixation of parts to one another.

It is also preferably provided that the spring assembly is composed of a plurality of Belleville washers.

To make it easier to arrange and install the spring assembly, the spring assembly is in a bushing arranged in the housing.

To ensure smooth and unencumbered operation of the device, an axial bearing is between the spring assembly or parts thereof and the projecting regions of the bolt.

For the same reason, an axial bearing is between the projecting regions of the bolt and the piston.

In addition, the piston is preferably be sealed in the housing, and is optionally also sealed from the drive shaft. An face of the piston at the rear end of the drive shaft is in connection with the pressure medium connection.

Such a design is thus especially useful for avoiding leaks when a hydraulic fluid is used as the pressure medium. To prevent unwanted rotation of the piston and/or the spring assembly in the housing, the piston and/or the spring assembly or a bushing of the spring assembly are retained in the housing so as to be axially movable in a limited manner, and non-rotatable about the central longitudinal axis of the drive shaft.

To avoid the risk of loosening of the threaded connections when the tool is actuated, the threaded connection between the cap screw and the actuator rod is secured against loosening. This arrangement prevents loosening of the threaded connections when the device is operated, so that loss of pretension with regard to the pretension of the tool is to be excluded.

Also the threaded connections between the cap screw and actuator rod and bolt are configured with a right-handed thread if the drive shaft rotates left, and analogously configured with a left-handed thread if the drive shaft rotates right.

BRIEF DESCRIPTION OF THE DRAWING

The above and other objects, features, and advantages will become more readily apparent from the following description, reference being made to the accompanying drawing in which.

SPECIFIC DESCRIPTION OF THE INVENTION

Figure 1:
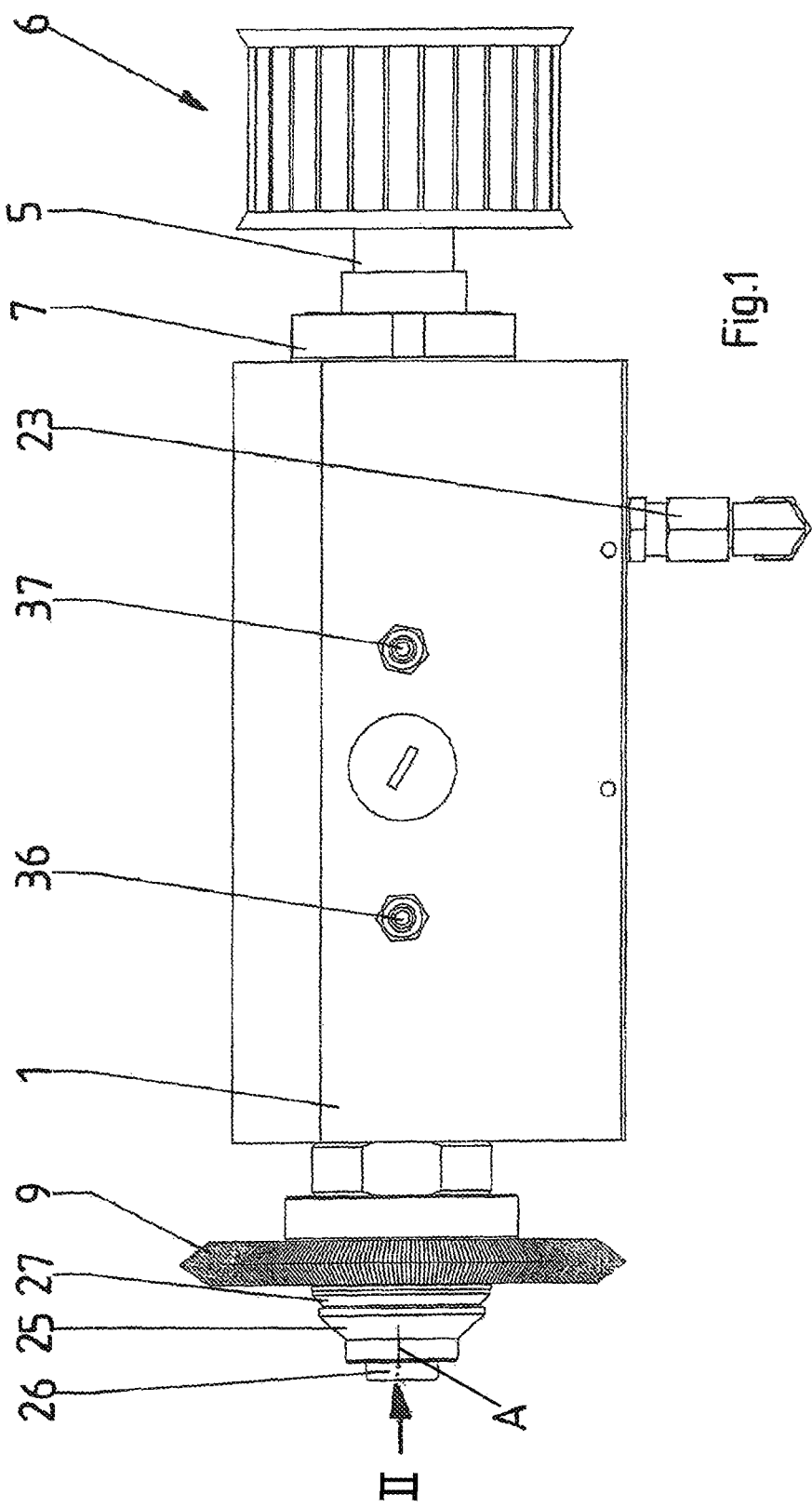
FIG. 1 is a side view of the milling machine according to the invention.
Figure 2:
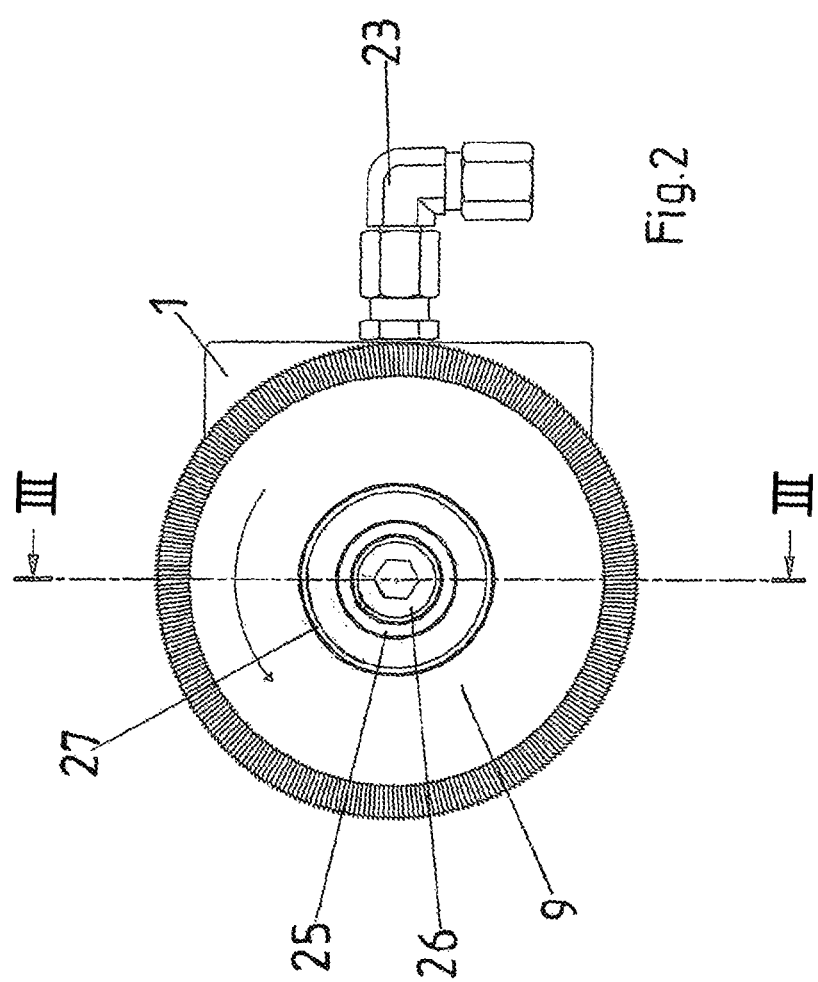
FIG. 2 is an axial end view taken in the direction of arrow II of FIG. 1.
Figure 3:
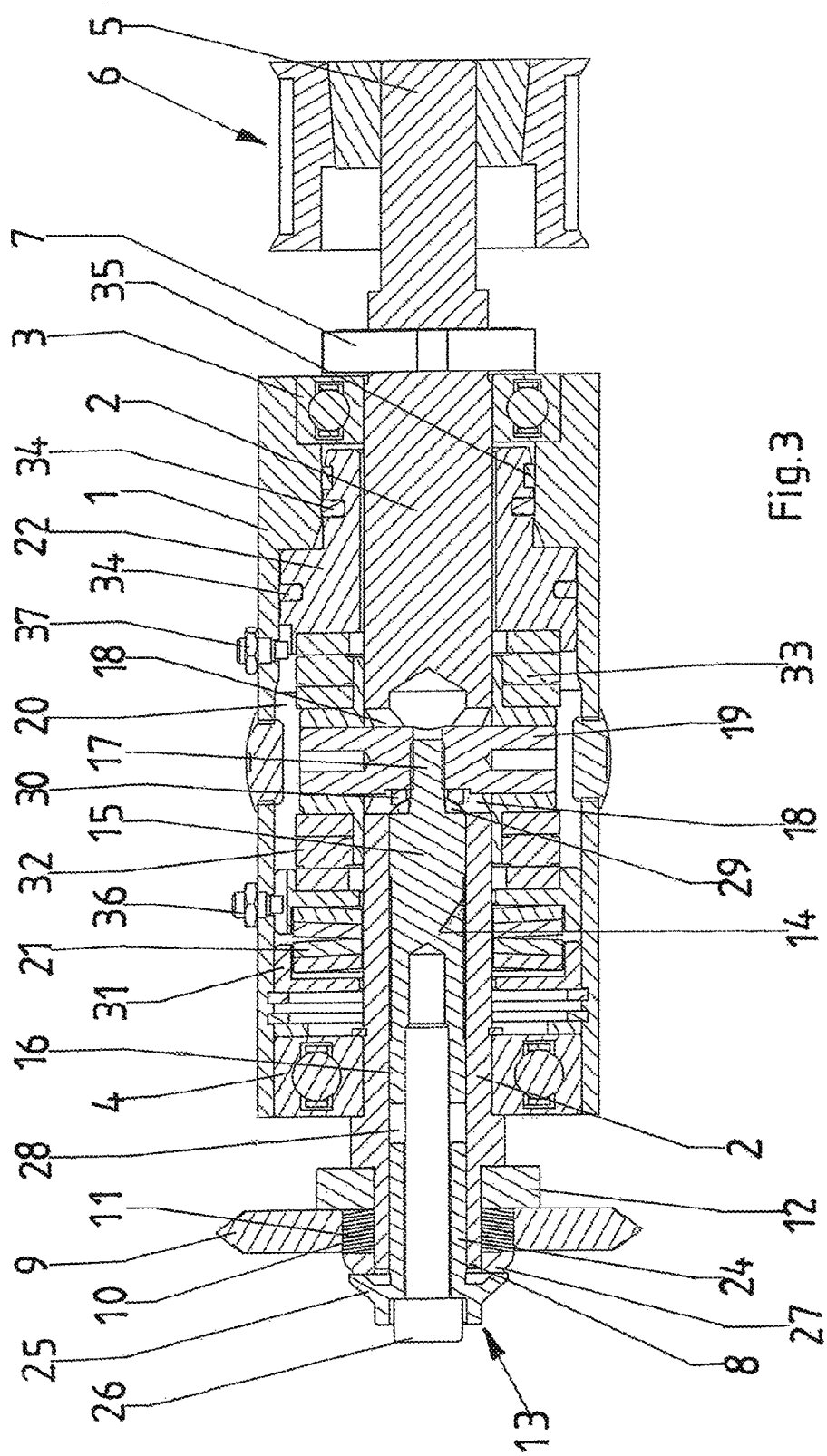
FIG. 3 is a cross section taken along line of FIG. 2.

As seen in FIGS. 1-3 a milling machine for sharpening blades of a root-vegetable processor has a drive shaft 2 rotatable about an axis A in a housing 1. The drive shaft 2 is carried on bearings 3, 4, here roller bearings with inner and outer races provided at the ends of the housing 1. A rear end of the drive shaft 2 projects axially rearward out of the housing and carries means 6 for coupling to an unillustrated drive motor. In the embodiment, the means 6 is, for example, a toothed wheel adapted to be connected by an unillustrated toothed belt and the drive motor. A snap ring 7 is set in the rear end 5 to axially secure the shaft 2 in the housing 1.

A front end 8 of the drive shaft 2 projects axially forward from the housing 1 and is supported by the bearing 4. This front end 8 carries a milling tool 9, for example a cutting disk. The tool 9 has a central cylindrical mounting hole 10 carried on the shaft 2 via a stack 11 of washers carried on the shaft 2. When installed, the tool 9 bears axially rearwardly against an abutment 12 fixed to the shaft 2. The washer stack 11 can be axially compressed by the assembly 13 to expand radially in the hole 10 of the tool 9 and thereby rotationally lock the tool 9 on the shaft 2.

The drive shaft 2 has a channel 14 that is axially forwardly open and axially rearwardly closed. This passage 14 holds an axially shiftable actuator rod 15 that is coupled to the clamping assembly 13 at its front end 16. A rear end 17 of the rod 15 is coupled to a bolt 19 extending transversely through the drive shaft 2 in an axially oriented elongated hole 18. This bolt 19 projects radially out through the drive shaft 2 in a free space 20 between the shaft 2 and the housing 1.

Between the projecting ends of the bolt 19 and the bearing 4 at the front end 8 of the drive shaft 2 is a prestressed spring assembly 21 is axially forwardly braced on the housing 1 and axially rearward on the bolt 19 that is axially fixed to the rod 15. Also between the projecting regions of the bolt 19 and the rear bearing 3 at the rear end 5 of the drive shaft 2 between the shaft and the housing 1 is an axially displaceable piston 22 that can be moved axially forward by pressure from a compressed air connection 23 against the spring force of the spring assembly 21.

The drawings show the normal position of the piston 22. If pressure is applied to the piston 22 with a pressure medium, it shifts forward, to the left in FIG. 3, and entrains the parts 13, 15, 17, and 19 forward of it, thereby tensioning the spring assembly 21. This movement of the parts 13, 15, 17, 19 generated thereby produces a relaxation of the stack 11 or Belleville washers, such that the friction-locked connection between the washer stack 11 and the tool 9 is released. The tool 9 can then be withdrawn manually to the left in the drawings, and replaced with a new tool. If the tool is in the position of FIG. 3, the piston 22 can be reset to the original position according to FIG. 3, if pressure is relieved through the coupling 23, resetting being effected by the force of the spring assembly 21.

In this position, the tool 9 is reclamped. Thus changing tools only requires only a short time and minimal installation space, and can be done totally manually, that is without the use of any tools.

The clamping assembly 13 consists essentially of a cap screw 26 with a head. The clamping sleeve 24 is axially shiftable in the central passage 14 of the drive shaft 2, and its head 25 bears axially rearward via a ring 27 on the front end of the washer stack 11 facing away from the abutment 12 fixed to the shaft 2. The head of the cap screw 26 bears axially rearward on the head 25 of the sleeve 24, and the screw 26 is threaded into the actuator rod 15. There is an axial spacing 28 between the actuator rod 15 and the clamping sleeve 24 to permit the required space for travel of the clamping assembly 13. The dimensions of the clamping head 25, the clamping piece 27, and the head of the clamping screw 26 transversely to the axial extension of the drive shaft 2 are selected such that the tool 9 can pass axially over these parts with the hole 10 thereof.

The rear end 17 of the actuator rod 15 is screwed directly into the bolt 19. A form-fitted ring 29 fits axially between the rod 19 and the rod 15 to ensure good axial force transmission therebetween.

Preferably, the spring assembly 21 is formed by another stack of Belleville washers and bears against a bushing 31 that is axially traversed with clearance by the shaft 2 and that bears axially forward against a snap ring set in the housing 1. In addition, an axial bearing 32 is provided between the spring assembly 21 or parts thereof (or parts of the bushing 31) and the projecting ends of the bolt 19. There is also a corresponding axial bearing 33 between the projecting regions of the bolt 19 and the piston 22.

The piston 22 is sealed relative to the housing 1, and optionally to the drive shaft 2, and a rear end face of the piston 22 located to the right in the drawings is adjacent the rear end of the drive shaft 2 in exposed to pressurized air from the connection 23, so that pressure can be applied to this rear end face. Seals 34 are provided between the piston 22 and the housing 1. A guide 35 is also carried on the piston 22.

The piston 22 and also the spring assembly 21 or the bushing 31 thereof are retained in the housing 1 so as to be axially movable in a limited manner and non-rotatable about the central longitudinal axis of the drive shaft 2. To this end, bolts 36 and 37 are seated in the housing 1 and engage radially inward into radially open and axially extending slots of the piston 22 and bushing 31 with their radially inner ends.

In addition, the threaded connection between the cap screw 26 and the actuator rod 15 is secured against loosening, for example by an adhesive.

The threaded connection between the cap screw 26 and the actuator rod 15 and between the actuator rod and the bolt 19 are right-handed threads if the drive shaft 2 rotates to the left. If the drive shaft rotates to the right, the corresponding threaded configurations are analogously provided as left-handed threads. This prevents loosening when the drive shaft 2 is operated.

The design according to the invention and shown in the drawings makes it very easy to switch the tool 9 with minimal spatial requirements. The same clamping force is set for the tool 9 and assembly and disassembly can both be done without tools.

At first installation, the tool 9 is clamped by the washer stack 11 by application of axial force to the washer stack. This is done by the cap screw 26 that causes the washer to compress axially and expand radially in the tool, so that a friction-locked torque transmission takes place via the drive shaft 2.

The introduction of axial force into the washer stack is done once, namely during the first installation of the tool 9.

To remove the tool 9, pressure is applied hydraulically or pneumatically to the piston 22 at its rear end face. The introduction of force from the piston 22 via the axial bearing 33, the bolt 19, the axial bearing 32, and the actuator rod 15 relaxes the washer stack 11, thereby reducing its radial dimension so that the tool 9 can be manually removed, i.e. can be withdrawn forward to the left. A new tool 9 is then slid on. When the hydraulic system is depressurized, the spring assembly 21 is effective due to its prestress to again clamp the tool.

The invention is not limited to the illustrated embodiment, but rather can be widely varied within the framework of the disclosure. In addition, all individual and combined features disclosed in the description and/or drawings are regarded as essential to the invention.

I claim:

1. A milling apparatus comprising:
a housing;
a drive shaft extending along and rotatable about an axis in the housing and having an axially front end, an axially rear end, an axially extending central passage open at the front end, and a transversely throughgoing and axially elongated slot;
an axially compressible and radially expansible washer stack on the front end of the drive shaft;
a tool having a central hole with a diameter greater than a diameter of the washer stack when the washer stack is axially not compressed and radially expanded;
a bolt projecting radially in the slot through the shaft and limitedly axially displaceable in the shaft;
an actuator element shiftable axially in the passage and having a front end and an opposite rear end fixed in the bolt;
clamping means on the front end of the drive shaft and connected to the actuator element for axially compressing and radially expanding the stack and thereby locking the tool to the drive shaft;
a spring assembly braced axially forward against the housing and axially rearward against the bolt and urging the bolt and clamping means axially rearward to radially expand the washer stack and lock the tool on the drive shaft;
a piston axially displaceable on the drive shaft in the housing and bearing axially forward on the bolt; and
means for pressurizing a rear face of the piston and pressing the piston forward against the bolt to compress the spring assembly and relax the washer stack so that the tool can be taken on and off the drive shaft, whereby depressurization at the rear face allows the spring assembly to rearwardly shift the bolt and thereby lock the washer stack to the tool.

2. The milling apparatus defined in claim 1, further comprising:
an abutment axially fixed on the drive shaft, the washer stack bearing axially rearward on the abutment, the clamping means including
a sleeve axially displaceable in the passage axially forward of the actuator element and having a head bearing axially rearward on the washer stack to press the same against the abutment; and
a screw threaded into the actuator element and having a head bearing axially rearward on the head of the sleeve.

3. The milling apparatus defined in claim 1, wherein the actuator element is an actuator rod.

4. The milling apparatus defined in claim 1, wherein the spring assembly is formed by a plurality of Belleville washers.

5. The milling apparatus defined in claim 1, further comprising an abutment sleeve braced axially forward against the housing and holding the spring assembly.

6. The milling apparatus defined in claim 1, further comprising:
   an axial bearing between the spring assembly and the bolt.

7. The milling apparatus defined in claim 1, further comprising:
   an axial bearing between the piston and the bolt.

8. The milling apparatus defined in claim 1, wherein the piston is sealed against the housing and against the drive shaft, the means for pressurizing including a fluid-medium connector on the housing opening into the housing axially rearward of the piston.

9. The milling apparatus defined in claim 1, further comprising:
   means for preventing rotation of the piston or the spring assembly in the housing.

10. The milling apparatus defined in claim 1, further comprising means for inhibiting unscrewing of the actuator element from the bolt.

11. The milling apparatus defined in claim 1, wherein a threaded screw connection between the actuator element and the bolt is of a hand opposite a rotation direction of the drive shaft about the axis.

* * * * *